(12) United States Patent
Joyce et al.

(10) Patent No.: US 9,690,444 B1
(45) Date of Patent: Jun. 27, 2017

(54) CUSTOM HELP SYSTEMS BY RUNTIME MODIFICATION OF GENERIC HELP FILES

(71) Applicant: EMC Corporation, Hopkinton, MA (US)

(72) Inventors: Scott E. Joyce, Foxboro (MA); Norman M. Miles, Bedford, MA (US); Bruce R. Rabe, Dedham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 295 days.

(21) Appl. No.: 13/834,465

(22) Filed: Mar. 15, 2013

(51) Int. Cl.
*G06F 9/44* (2006.01)
*G06F 3/0481* (2013.01)

(52) U.S. Cl.
CPC ............. *G06F 3/0481* (2013.01); *G06F 8/20* (2013.01); *G06F 8/71* (2013.01)

(58) Field of Classification Search
CPC ............ G06F 8/20; G06F 8/71; G06F 3/0481
USPC ......................................................... 717/120
See application file for complete search history.

(56) References Cited

U.S. PATENT DOCUMENTS

| | | | | |
|---|---|---|---|---|
| 7,024,658 B1* | 4/2006 | Cohen | ................... | G06F 9/4446 715/705 |
| 7,721,259 B2 | 5/2010 | Heinke et al. | | |
| 8,099,664 B2 | 1/2012 | Kureshy et al. | | |
| 8,336,043 B2 | 12/2012 | Lavery et al. | | |
| 8,793,676 B2 | 7/2014 | Quinn et al. | | |
| 2002/0063161 A1* | 5/2002 | Goodwin et al. | ........ | 235/472.01 |
| 2004/0230958 A1* | 11/2004 | Alaluf | ..................... | G06F 8/447 717/140 |
| 2008/0133681 A1* | 6/2008 | Jackson et al. | ............... | 709/206 |
| 2011/0154372 A1* | 6/2011 | Niazi | ............................. | 719/320 |
| 2012/0242598 A1* | 9/2012 | Won | .................... | G06F 3/04886 345/173 |
| 2013/0031541 A1* | 1/2013 | Wilks et al. | .................. | 717/176 |

\* cited by examiner

*Primary Examiner* — Li B Zhen
*Assistant Examiner* — Bradford Wheaton
(74) *Attorney, Agent, or Firm* — BainwoodHuang

(57) ABSTRACT

A method delivers a help process customized for a particular operating environment using a help system that initially has more generic content. The method includes obtaining system-specific information about a target system. A wrapper is instantiated by invoking it with the system-specific information as invocation parameters, the wrapper providing wrapper methods for modifying help content files of the help system that initially store the more generic content. The wrapper then (1) instantiates the help system, and (2) uses the wrapper methods to modify the help content files based on the invocation parameters to include the system-specific information instead of or in addition to the more generic content. The help system subsequently uses the help content files as modified in subsequent operation. In operation, the help system reflects the system-specific information, providing desirable customized functionality while leveraging automated design tools used to generate the more generic help system content.

28 Claims, 3 Drawing Sheets

CUSTOM HELP SYSTEMS BY RUNTIME MODIFICATION OF GENERIC HELP FILES

BACKGROUND

The present invention relates to the field of graphical user interfaces, and in particular to help systems employed in graphical user interfaces.

It is known to deploy interactive help systems in graphical user interfaces (GUIs) for a wide variety of products and systems, including both software products (applications) and hardware products (computer-related components, other consumer electronics, etc.). A typical help system includes an organized set of displayable pages containing pertinent information on all the functions/features of the target product or system. For example, there may be pages related to setup and configuration, other pages related to regular operation, and yet other pages related to troubleshooting or other types of problem solving.

In many cases a help system is designed and implemented along with a GUI that is either part of the target product or part of an application used in conjunction with the target product. In one example, a help system may be included in a GUI for a storage management application used to manage the operation of computer storage systems. One such application is known by the name Unisphere® sold by EMC Corporation. In such cases the help system can be seen as essentially an extension of the target system that the help is used for, and in particular an extension of the target system as viewed and described by the manufacturer of the system and not necessarily the purchasers or third parties that may be involved with the sale or use of the target system. In other words, when a target system is deployed in a specific environment, the help system reflects information about the target system in a general way and normally not in any way reflecting the particular environment of deployment.

Another features of interactive help systems, like other GUI components, is their design and implementation using automated tools. The basic structure and functioning of help systems, for example, is well established and common across a large number of instances, so automation makes technical and economic sense. A manufacturer may provide raw information about a target system, and the design tools can be applied to the raw information to create a complete, functional help system.

SUMMARY

While the automated design and implementation of help systems has wide use and benefits, they are normally used to create help systems that will have broad use and therefore a somewhat generic nature. When a reseller sells a product having a help system, for example, the help system normally does not specifically reflect any aspects of the product as sold or deployed by that reseller. However, such customization could be advantageous. For example, if a feature of a product is removed or disabled by a particular reseller or user organization, it would be useful if the help system could be tailored to remove any information or references to the disabled or missing feature. Such variable customization of help systems can be difficult or impossible using automated design tools, as it become difficult to account and design for a potentially large number of variations in the configuration, use or other aspects of a target system.

A method is disclosed for delivering a help process customized for a particular operating environment using a help system that initially has more generic content, such as a help system designed using automated tools for use with a product that might be deployed in a large number of ways.

The method includes obtaining system-specific information about a particular target system for which the help system is to provide help. A wrapper for the help system is instantiated by invoking the wrapper with the system-specific information as invocation parameters, the wrapper providing wrapper methods for modifying help content files of the help system that initially store the more generic content of the help system. The wrapper then (1) instantiates the help system, and (2) uses the wrapper methods to modify the help content files based on the invocation parameters to include the system-specific information instead of or in addition to the more generic content. The help system subsequently uses the help content files as modified in subsequent operation. In operation, the help system reflects the system-specific information, providing desirable customized functionality while continuing to leverage the automated design tools that generate the more generic help system content.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
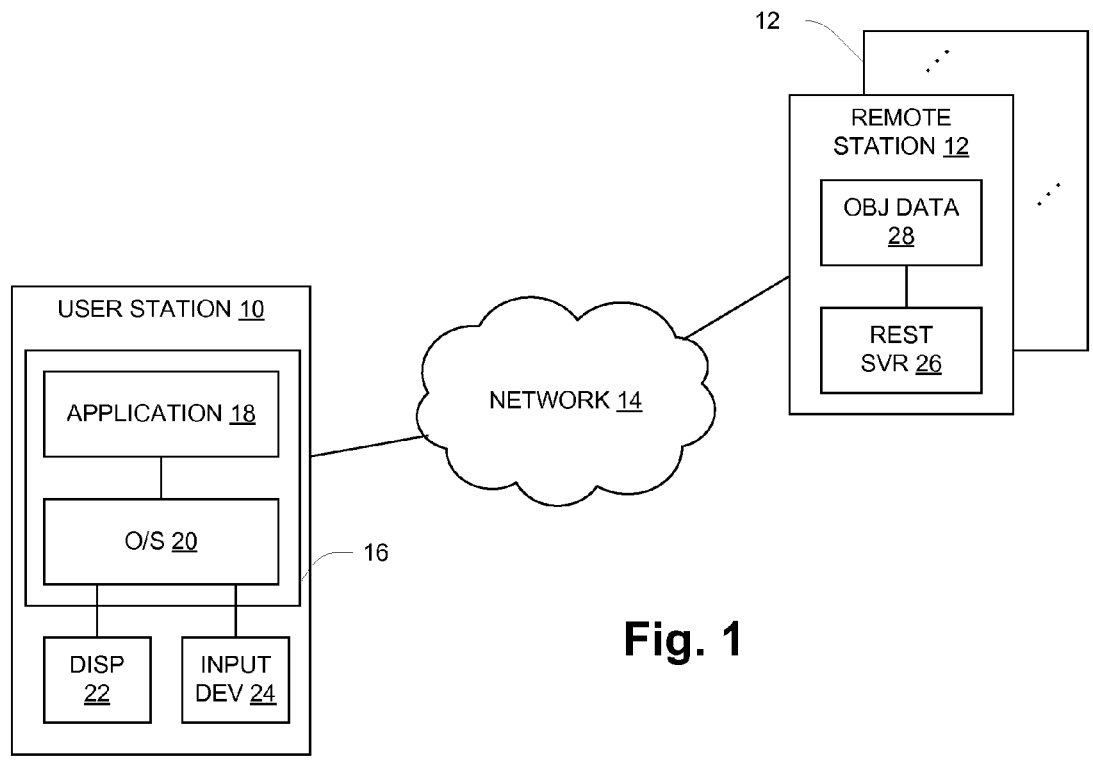
FIG. 1 is a block diagram of a computer system.

FIG. 1 shows a system environment for a client-server application in which a user station 10 is coupled to one or more remote stations 12 via a network 14. As shown, the user station 10 includes computer instruction execution circuitry 16 executing an application program or "application" 18 and an operating system (O/S) 20, along with a display device or display (DISP) 22 and an input device (INPUT DEV) 24 such as a keyboard or pointer device. The remote station 12 executes a representational state transfer server (REST SVR) 26 having access to stored object data (OBJ DATA) 28. The application 18 uses the display 22 to present a graphical user interface (GUI) to a human user, specifically to display the object data 28 of the remote station 12 in a visually organized fashion.

The object data 28 may generally be any type of data presentable to a user by a visual display. Individual data items may be of different data types including character strings, numbers (e.g. integers), dates, and Boolean values, and there may be higher-level data constructs such as arrays or more general objects/structures that include sub-items of different types. Specific examples are provided below.

In one embodiment the remote stations 12 may be integrated storage systems such as those sold under the trademarks VNX® and VNXe® by EMC Corporation. Such a storage system includes a set of physical storage devices such as disks or Flash memory arrays, along with storage controllers that perform a variety of storage-related functions in presenting storage resources to external storage users. The functions may include RAID, remote replication, caching, failover, etc. The object data 28 includes information about device configuration, capacities, and operational monitoring at different levels (e.g., performance monitoring, error monitoring, and lower-level environmental monitoring) as generally known in the art. The application 18 and server 26 constitute a storage management application such as the above-mentioned Unisphere product of EMC Corporation. The application 18 issues requests for the object data 28 as organized into identified resources, and the REST server 26 provides responses containing requested resource data with a REST structuring. The interface between the application 18 and REST server 26 may be referred to as an "application programming interface" or API. In one embodiment, the API employs HTTP commands/requests such as GET, POST, etc. Response data may be provided in a markup language format such as XML or some other type of object description such as JavaScript Object Notation (JSON).

As described more below, the application 18 may be provided by (or on behalf of) a manufacturer of the remote stations 12, and thus include certain generic or default information that is generally applicable to the remote stations 12 as a class, for example based on a product model or family. It is assumed that there is reason to modify or override such generic information for a particular instance or sub-class of the remote stations 12 actually deployed in a given system. In one simple example, the remote stations 12 manufactured by a manufacturing company MFR may be sold to an end-user organization via a sales channel or reseller, and for marketing and other reasons it may be desired to identify the reseller company RESELLER as the source of the remote stations 12 rather than MFR. Other scenarios involving third parties, including for example third-party service vendors providing post-manufacturing maintenance and repair services for a system, are common. More specifics about the need for such functionality and methods and apparatus for providing it are described fully below.

Figure 2:
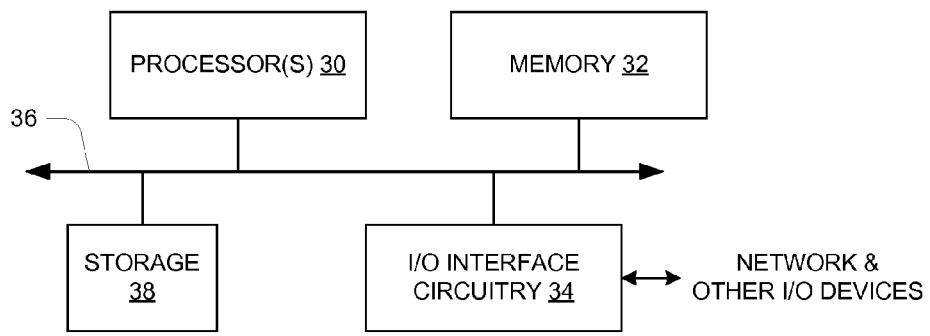
FIG. 2 is a hardware block diagram of a computer.

FIG. 2 shows an example configuration of a physical computer such as a user station 10 or remote station 12 from a computer hardware perspective. The hardware includes one or more processors 30, memory 32, and I/O interface circuitry 34 interconnected by data interconnections 36 such as one or more high-speed data buses. The interface circuitry 34 provides a hardware connection to the network 14 (FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a client application, such as described herein, can be referred to as a client circuit or client component, and it will be understood that a collection of such circuits or components can all be realized and interact with each other as one or more sets of computer processing hardware executing different computer programs as generally known in the art.

Figure 3:
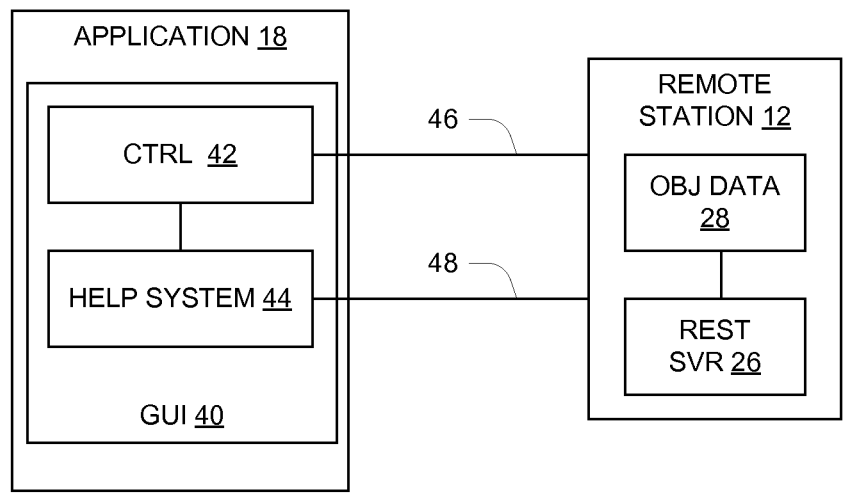
FIG. 3 is a more detailed block diagram of a portion of a computer system.

FIG. 3 shows the system in some additional detail. The application 18 includes a graphical user interface (GUI) 40 for presenting information to a user via the display 22 (FIG. 1) as generally known in the art. The GUI 40 includes a main controller (CTRL) 42 and a help system 44. The main controller 42 provides the functionality needed for the application 18, for example configuration, startup, presentation, navigation, etc. The help system 44 is a specialized sub-component serving a structured, and often extensive, set of tips, tools, information collections, guides or wizards, etc. as generally known in the art. As shown, the main controller 42 and help system 44 have respective connections 46, 48 to the remote station 12 for obtaining information that is to be displayed in the GUI 40, either as part of the main functionality (e.g., specific storage management functions) or as part of the help process and pages.

Generally, a help system is intimately connected with a given GUI and thus often described as being part of the GUI, although in some ways it is also a client of the GUI and thus separate from it. This quasi-separateness provides certain opportunities in the design process. Because of the extensive use and relatively consistent form of help systems, their design and implementation can be automated to a large degree. Commercial vendors create and use specialized tools that can generate a complete set of help modules forming a fully functional help system based on a set of help documents or files provided by the manufacturer of a system or software product for which the help is provided. Currently, however, the benefits of such automated help creation tools are realized only at scale, i.e., to realize a help system that will be widely deployed and thus justify design costs. It is generally not feasible to introduce a large number of variables into the specification of a help system that is to be realized using automated tools.

It can be beneficial to tailor or customize a help system for a variety of reasons. For example, it may be desired to "OEM", hide, or disable content within a help system, where "OEM" refers to incorporating components from one manufacturer into products of another manufacturer or reseller. These functions may be performed based on variables such as the specific configuration of a target system and licenses, for example. This goal cannot readily be met by the above-described automated approach to help system design and implementation.

Figure 4:
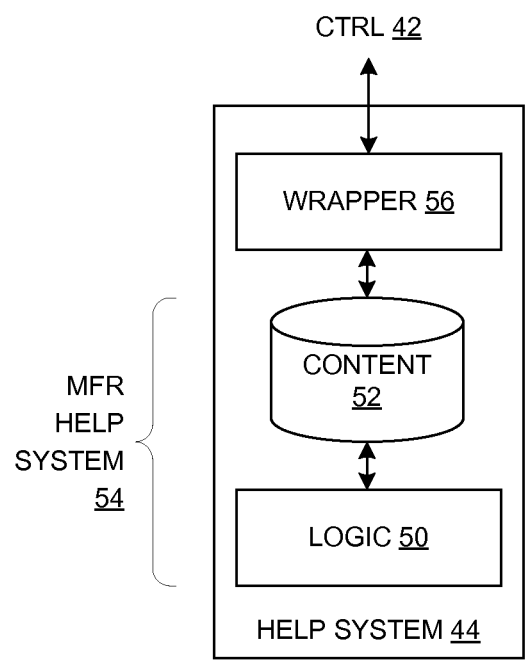
FIG. 4 is a schematic diagram depicting organization of a customized help system.

FIG. 4 shows an organization that enables customization of a help system or similar software component while still making use of a more generic help system as produced by automated design tools. Generally, the approach is to have the GUI 40 pass additional information to a custom help system "wrapper" that hosts and dynamically modifies a more generic help system, specifically providing more specific content in place of or in addition to the more generic content provided by the generic help system. Content to be modified may be text or other data values, or code defining how data is to be displayed (e.g., links or tabs). The arrangement preserves the use of existing help tools and processes, while also enabling OEM'ing and other customizations such as or hiding or altering features within a help code base.

In FIG. 4 the help system 44 is shown as including logic 50 and a content store 52 which together make up the more generic help system, referred to as the "manufacturer (MFR) help system" 54 for the above-mentioned case of a help system provided by the manufacturer of a storage system or other type of remote system 12. Additionally, the help system 44 incorporates a wrapper 56 that is in communication with both the main controller 42 of the GUI (FIG. 3) and with the content 52. The content store 52 may be realized in a variety of forms, including for example hypertext or markup-language files, etc. Although not shown, the wrapper 56 may include a customization file including a set of customized values that can be referred to by higher-level variables in the code of the wrapper 56, so that code can be reused across multiple types of systems. For example, the code may refer to a value using the variable "resellerName", and this name is mapped to a particular reseller name (e.g., Reseller, Inc.) via the customization file, which may also be referred to as a "properties" file.

The content store 52 as initially instantiated or deployed includes content having a relatively generic quality, such as information identifying a manufacturer of the remote stations 12. The wrapper 56 includes methods for finding and replacing content for purposes of customization, in a particular system and at a time of system use or configuration.

The following example demonstrates how content can be modified within an existing help system for a storage management application having the name "Unisphere" as delivered from a manufacturer. In this example, the name is changed to another name shown as "MyProductName."

// Change the title
document.title="MyProductName"
/ Change Unisphere String in the body of the main page
//Get element we want to change
var myElement=window.frames[1].window.frames[1].document.getElementsByClassName ("EMCParagraph") [0];
var updatedText=myElement.innerHTML.replace("Unisphere", "MyProductName");
myElement.innerHTML=updatedText;

In one embodiment, the help wrapper 56 can be implemented using hypertext markup language (HTML) or Javascript. If required, the custom HTML wrapper can be dynamically generated on the server 26 using request body data, allowing for a large number of configuration changes. For more modest changes the wrapper 56 could be hard coded and make use of URL parameters for example.

Figure 5:
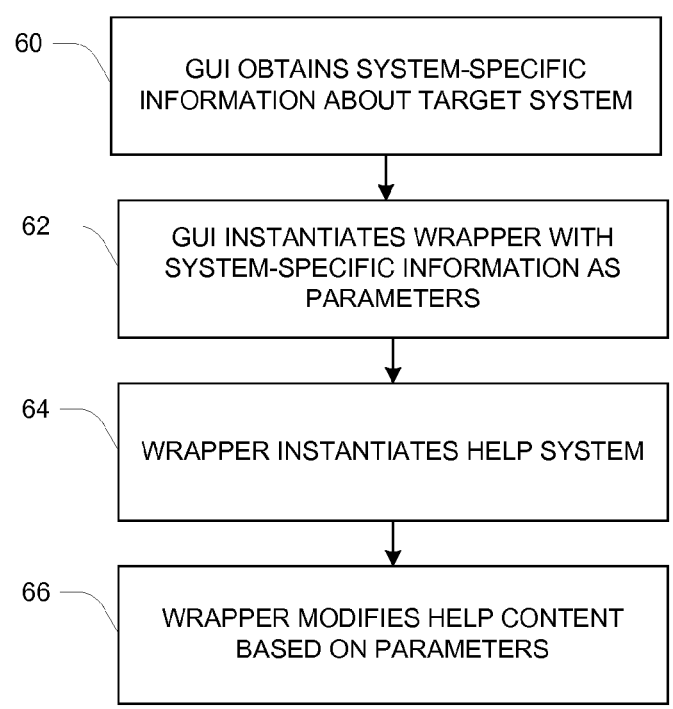
FIG. 5 is a flow diagram describing operation of a computer using a customized help system.

FIG. 5 illustrates overall operation that provides customized help using the organization of FIGS. 3-4. The method delivers a help process customized for a particular operating environment using a help system 40 initially having more generic content. The method is described as steps performed by the GUI controller 42 and the wrapper 56.

At 60, the GUI controller 42 communicates with the "target system" (e.g., the remote station 12) to obtain system-specific information about the target system that is to be incorporated into the content 52. Referring to the above example, the system-specific information might be an alternative product name or the name of a downstream source (e.g., reseller) of the system. At 62, the GUI controller 42 instantiates the wrapper 56 using the system-specific information as parameters passed to the wrapper 56. As mentioned, the wrapper provides wrapper methods for modifying help content files 52 that initially store the more generic content of the help system 40. Steps 64 and 66 are performed by the wrapper 56. At 64, the wrapper 56 instantiates the help system, and at 66 it employs the wrapper methods to modify the help content files 52 based on the parameters received from the GUI controller 42. By this modification, it includes the system-specific information instead of or in addition to the more generic content. The help system 40 then uses the help content files as modified in subsequent operation.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a workstation to provide a customized help process customized for a particular operating environment using a help system initially having more generic content, comprising:
    executing an application having a graphical user interface, the graphical user interface including a GUI controller;
    by the GUI controller of the graphical user interface:
        (1) obtaining system-specific information about a particular target system for which the help system is to provide help;
        (2) instantiating a wrapper for the help system by invoking the wrapper with the system-specific information as invocation parameters, the wrapper including executable code providing wrapper methods for modifying help content files of a generic help system that initially store the more generic content; and
    by execution of the executable code upon instantiation of the wrapper, (1) instantiating the help system with the help content files having the more generic content, and (2) using the wrapper methods to modify the help content files based on the invocation parameters to include the system-specific information instead of or in addition to the more generic content, the modifying of the help content files transforming the help system into a customized help system using the help content files as modified to provide help customized for the target system in subsequent operation,
    wherein the wrapper is implemented using hypertext markup language or Javascript containing the executable code, and is dynamically generated using request body data, allowing for a large number of configuration changes.

2. A method according to claim 1, wherein the more generic content is provided by or on behalf of a manufacturer of the target system and include manufacturer-specific information, and the system-specific information includes third-party-specific information of a third party having a particular post-manufacturing role with respect to the target system.

3. A method according to claim 2, wherein the third party is a reseller or other intermediate supplier of the target system.

4. A method according to claim 2, wherein the third party is a service vendor providing post-manufacturing services for the target system.

5. A method according to claim 1, wherein the generic content is provided in the form of hypertext pages or code modules, and the wrapper methods are operative to replace data and code in the hypertext pages or code modules.

6. A method according to claim 5, wherein the hypertext pages or code modules include presentation code describing display elements for displaying information in the graphical user interface, and the wrapper methods are operative to modify the presentation code to add, modify and/or delete descriptions of the display elements.

7. A method according to claim 6, wherein the display elements include hypertext links and/or tabs.

8. A method according to claim 1, wherein the methods of the wrapper are invoked by initiating operation of the help system with parameters specifying content changes to be made.

9. A method according to claim 1, wherein the wrapper employs a property file storing system-specific values to be used in displaying the system-specific information.

10. A method according to claim 1, wherein the wrapper includes (1) a customization file including a set of customized values, and (2) code referring to the customized values using high-level variable names, whereby the code can be reused across multiple types of systems.

11. A method according to claim 10, wherein a high-level variable name describes a class, and the customization file maps the high-level variable name to a particular instance of the class.

12. A non-transitory computer-readable medium storing computer program instructions, the instructions being executable by a computer to cause the computer to perform a method of providing a customized help process customized for a particular operating environment using a help system initially having more generic content, the method including:
   executing an application having a graphical user interface, the graphical user interface including a GUI controller;
   by the GUI controller of the graphical user interface:
      (1) obtaining system-specific information about a particular target system for which the help system is to provide help;
      (2) instantiating a wrapper for the help system by invoking the wrapper with the system-specific information as invocation parameters, the wrapper including executable code providing wrapper methods for modifying help content files of a generic help system that initially store the more generic content; and
   by execution of the executable code upon instantiation of the wrapper, (1) instantiating the help system with the help content files having the more generic content, and (2) using the wrapper methods to modify the help content files based on the invocation parameters to include the system-specific information instead of or in addition to the more generic content, the modifying of the help content files transforming the help system into a customized help system using the help content files as modified to provide help customized for the target system in subsequent operation,
   wherein the wrapper is implemented using hypertext markup language or Javascript containing the executable code, and is dynamically generated using request body data, allowing for a large number of configuration changes.

13. A non-transitory computer-readable medium according to claim 12, wherein the more generic content is provided by or on behalf of a manufacturer of the target system and include manufacturer-specific information, and the system-specific information includes third-party-specific information of a third party having a particular post-manufacturing role with respect to the target system.

14. A non-transitory computer-readable medium according to claim 13, wherein the third party is a reseller or other intermediate supplier of the target system.

15. A non-transitory computer-readable medium according to claim 13, wherein the third party is a service vendor providing post-manufacturing services for the target system.

16. A non-transitory computer-readable medium according to claim 12, wherein the generic content is provided in the form of hypertext pages or code modules, and the wrapper methods are operative to replace data and code in the hypertext pages or code modules.

17. A non-transitory computer-readable medium according to claim 16, wherein the hypertext pages or code modules include presentation code describing display elements for displaying information, and the wrapper methods are operative to modify the presentation code to add, modify and/or delete descriptions of display elements.

18. A non-transitory computer-readable medium according to claim 17, wherein the display elements include hypertext links and/or tabs.

19. A non-transitory computer-readable medium according to claim 12, wherein the methods of the wrapper are invoked by initiating operation of the help system with parameters specifying content changes to be made.

20. A non-transitory computer-readable medium according to claim 12, wherein the wrapper employs a property file storing system-specific values to be used in displaying the system-specific information.

21. A computer, comprising:
   a display for presenting a graphical user interface including a customized help process;
   an interface to a target system for which the customized help process is to be provided; and
   processing circuitry operative to execute an application program to cause the computer to perform a method of providing the customized help process customized for a particular operating environment using a help system initially having more generic content, the method including:
      executing an application having the graphical user interface, the graphical user interface including a GUI controller;
      by the GUI controller of the graphical user interface:
         (1) obtaining system-specific information about the target system;
         (2) instantiating a wrapper for the help system by invoking the wrapper with the system-specific information as invocation parameters, the wrapper including executable code providing wrapper methods for modifying help content files of a generic help system that initially store the more generic content; and
      by execution of the executable code upon instantiation of the wrapper, (1) instantiating the help system with the help content files having the more generic content, and (2) using the wrapper methods to modify the help content files based on the invocation parameters to include the system-specific information instead of or in addition to the more generic content, the modifying of the help content files transforming the help system into a customized help system using the help content files as modified to provide help customized for the target system in subsequent operation,
      wherein the wrapper is implemented using hypertext markup language or Javascript containing the executable code, and is dynamically generated using request body data, allowing for a large number of configuration changes.

22. A computer according to claim 21, wherein the more generic content is provided by or on behalf of a manufacturer of the target system and include manufacturer-specific information, and the system-specific information includes third-party-specific information of a third party having a particular post-manufacturing role with respect to the target system.

23. A computer according to claim 21, wherein the generic content is provided in the form of hypertext pages or code modules, and the wrapper methods are operative to replace data and code in the hypertext pages or code modules.

24. A computer according to claim 23, wherein the hypertext pages or code modules include presentation code describing display elements for displaying information, and the wrapper methods are operative to modify the presentation code to add, modify and/or delete descriptions of display elements.

25. A computer according to claim 21, wherein the GUI controller provides functionality for the application including configuration, startup, presentation, and navigation, and the help system is a specialized sub-component serving a structured set of tips, tools, information collections, and guides or wizards, and wherein the GUI controller and the help system have respective connections to the target system for obtaining information that is to be displayed in the GUI either as part of main functionality or as part of the customized help process and help pages.

26. A computer according to claim 25, wherein the target system is a data storage system, and the computer is a user workstation station executing the application to provide the GUI to a user for managing the data storage system.

27. A computer according to claim 21, wherein the wrapper includes (1) a customization file including a set of customized values, and (2) code referring to the customized values using high-level variable names, whereby the code can be reused across multiple types of systems.

28. A computer according to claim 27, wherein a high-level variable name describes a class, and the customization file maps the high-level variable name to a particular instance of the class.

\* \* \* \* \*